(12) United States Patent
Lyadvinsky et al.

(10) Patent No.: US 9,471,441 B1
(45) Date of Patent: Oct. 18, 2016

(54) SYSTEMS AND METHODS FOR BACKUP OF VIRTUAL MACHINES

(71) Applicants: Maxim V. Lyadvinsky, Moscow (RU); Serguei M. Beloussov, Costa del Sol (SG); Vladimir Miroshkin, Moscow (RU); Alexey Ruslyakov, Moscow Region (RU)

(72) Inventors: Maxim V. Lyadvinsky, Moscow (RU); Serguei M. Beloussov, Costa del Sol (SG); Vladimir Miroshkin, Moscow (RU); Alexey Ruslyakov, Moscow Region (RU)

(73) Assignee: Acronis International GmBh (CH)

( * ) Notice: Subject to any disclaimer, the term of this patent is extended or adjusted under 35 U.S.C. 154(b) by 0 days.

(21) Appl. No.: 14/320,555

(22) Filed: Jun. 30, 2014

Related U.S. Application Data

(60) Provisional application No. 61/869,467, filed on Aug. 23, 2013, provisional application No. 61/869,470, filed on Aug. 23, 2013, provisional application No. 61/869,480, filed on Aug. 23, 2013.

(51) Int. Cl.
 *G06F 11/14* (2006.01)

(52) U.S. Cl.
 CPC ....... *G06F 11/1464* (2013.01); *G06F 11/1435* (2013.01); *G06F 11/1484* (2013.01); *G06F 2201/815* (2013.01); *G06F 2201/84* (2013.01)

(58) Field of Classification Search
 CPC ........... G06F 11/1464; G06F 11/1435; G06F 11/1484; G06F 2201/84; G06F 2201/815
 USPC ....................................................... 711/162
 See application file for complete search history.

(56) References Cited

U.S. PATENT DOCUMENTS

| | | | |
|---|---|---|---|
| 6,101,585 A * | 8/2000 | Brown | G06F 11/1451 707/999.202 |
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |

(Continued)

*Primary Examiner* — Mark Giardino, Jr.
(74) *Attorney, Agent, or Firm* — K&L Gates LLP

(57) ABSTRACT

Various embodiments are directed to systems and methods for backing up a plurality of virtual machines, the method comprising. A computer system may initiate creation of a snapshot for each of the plurality of virtual machines. The computer system may select a first virtual machine from the plurality of virtual machines based on the input/output loads for each of the plurality of virtual machines and generate a backup archive of the first virtual machine.

25 Claims, 13 Drawing Sheets

(56) References Cited

U.S. PATENT DOCUMENTS

| | | |
|---|---|---|
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tsypliaev et al. |
| 8,296,264 B1 | 10/2012 | Yeresov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 2004/0260900 A1* | 12/2004 | Burton .................. G06F 3/0608 711/162 |
| 2006/0225065 A1 | 10/2006 | Chandhok et al. |
| 2010/0011178 A1 | 1/2010 | Feathergill |
| 2010/0049929 A1* | 2/2010 | Nagarkar ............ G06F 9/45533 711/162 |
| 2012/0011336 A1* | 1/2012 | Saika .................... G06F 3/0604 711/162 |
| 2012/0131480 A1* | 5/2012 | Kalmbach ................ G06F 9/46 715/763 |
| 2014/0156957 A1* | 6/2014 | Simoncelli .............. G06F 12/16 711/162 |
| 2014/0365740 A1* | 12/2014 | Vasilyev ............. G06F 11/1451 711/162 |

* cited by examiner

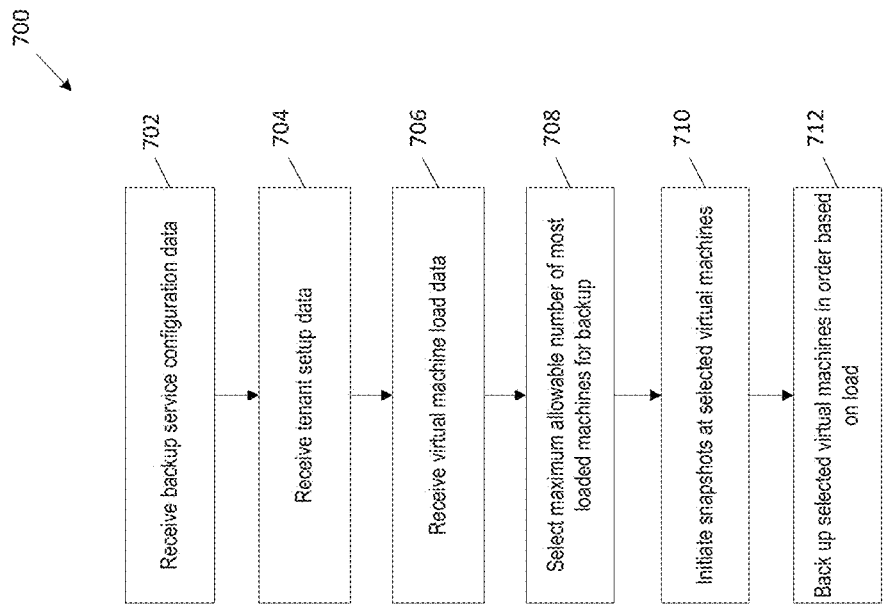

SYSTEMS AND METHODS FOR BACKUP OF VIRTUAL MACHINES

CROSS REFERENCE TO PRIOR APPLICATIONS

This application claims priority to and the benefit of U.S. Provisional Patent Application No. 61/869,470, filed on Aug. 23, 2013; U.S. Provisional Patent Application 61/869,467, filed on Aug. 23, 2013; and U.S. Provisional Patent Application No. 61/869,480, filed on Aug. 23, 2013, the entire contents of each of which are hereby incorporated by reference. This application is related to, and hereby incorporates by reference in their entireties, the following co-owned patent applications filed on even date herewith by Applicant Acronis International GmBh: U.S. patent application Ser. No. 14/320,393 entitled "Configuring Backup and Recovery Routines in a Cloud, Environment" filed on Jun. 30, 2014; U.S. patent application Ser. No. 14/320,409 entitled "Using A Storage Path To Facilitate Disaster Recovery", filed on Jun. 30, 2014; U.S. patent application Ser. No. 14/320,422 entitled "Granular Recovery Using Hot-Plug Virtual Disks", filed on Jun. 30, 2014; U.S. patent application Ser. No. 14/320,450 entitled "Hot Recovery of Virtual Machines", filed on Jun. 30, 2014; U.S. patent application Ser. No. 14/320,496 entitled "Snapshotless Backup", filed on Jun. 30, 2014; U.S. patent application Ser. No. 14/320,510 entitled "Recovery of Virtual Machine Files Using Disk Attachment", filed on Jun. 30, 2014; U.S. patent application Ser. No. 14/320,526 entitled "Agentless File Backup of a Virtual Machine", filed on Jun. 30, 2014; U.S. patent application Ser. No. 14/320,540 entitled "Machine Replication", filed on Jun. 30, 2014; and U.S. patent application Ser. No. 14/320,546 entitled "Data Backup Parallelization" filed on Jun. 30, 2014.

TECHNICAL FIELD

The technical field may generally relate to cloud computing, and more particularly to backup of virtual machines and other data, for example, in a cloud environment.

BACKGROUND

Various business critical applications may be run on virtual machines and thus it may be critical to create backups of such virtual machines in case a failure or loss of data occurs. Backing up a virtual machine may consume resources on the virtual machine, may cause the virtual machine to run slower, and may affect services supported by the virtual machine. For example, during some backup processes, write requests to the virtual machine being backed up may need to be written to a separate file and may use up valuable resources on the virtual machine. Accordingly, reducing the use of resources in a virtual machine during backup processes may be a primary goal in various business contexts.

BRIEF SUMMARY

In part, the disclosure relates to a computer-implemented system for backing up a plurality of virtual machines. The system includes at least one processor and operatively associated memory, wherein the at least one processor is programmed to: receive data describing an input/output load for each of the plurality of virtual machines; initiate creation of a snapshot for each of the plurality of virtual machines at a snapshot time; select a first virtual machine from the plurality of virtual machines based on the data describing the input/output load for each of the plurality of virtual machines; generate a backup archive of the first virtual machine based on the snapshot for the first virtual machine; after beginning to generate the backup archive of the first virtual machine, select a second virtual machine from the plurality of virtual machines based on the data describing the input/output load for each of the plurality of virtual machines; and generate a backup archive of the second virtual machine based on the snapshot for the second virtual machine.

In one embodiment, a backup time of the backup archive for the first virtual machine and a backup time of the backup archive for the second virtual machine is the snapshot time. In one embodiment, the at least one processor is further programmed to: determine that the plurality of virtual machines comprises additional virtual machines; select a third virtual machine from the additional virtual machines based on the data describing the input/output load for each of the plurality of virtual machines; and generate a backup archive of the third virtual machine based on the snapshot for the third virtual machine. In one embodiment, a backup time of the backup archive for the third virtual machine is the snapshot time.

In one embodiment, the first virtual machine has a higher input/output load than the second virtual machine. In one embodiment, the first virtual machine has the highest input/output load of the plurality of virtual machines and the second virtual machine has the second highest input/output load of the plurality of virtual machines. In one embodiment, the at least one processor is further programmed to collect the data describing an input/output load for each of the plurality of virtual machines.

In one embodiment, the snapshot for the first virtual machine is deleted before completion of the backup archive for the second virtual machine. In one embodiment, the at least one processor is further programmed to select the plurality of virtual machines from a set of virtual machines based on input/output load data. In one embodiment, the plurality of virtual machines comprises a predetermined number of virtual machines.

In one embodiment, the at least one processor is further programmed to: after beginning generating the backup archive for the first virtual machine and before beginning generating the backup archive of the second virtual machine, select a third virtual machine from the plurality of virtual machines based on the data describing the input/output load for each of the plurality of virtual machines; and in parallel with the generating the backup archive of the first virtual machine, generate a backup archive of the third virtual machine.

In one embodiment, the at least one processor is further programmed to receive tenant setup data, wherein the tenant setup data indicates the plurality of virtual machines and a schedule for backing up the virtual machines.

In part, the disclosure relates to a computer-implemented method for backing up a plurality of virtual machines. The method includes receiving, by a computer system, data describing an input/output load for each of the plurality of virtual machines, wherein the computer system comprises at least one processor and operatively associated memory; initiating, by the computer system, creation of a snapshot for each of the plurality of virtual machines at a snapshot time; selecting, by the computer system, a first virtual machine from the plurality of virtual machines based on the data describing the input/output load for each of the plurality of virtual machines; generating, by the computer system, a backup archive of the first virtual machine based on the snapshot for the first virtual machine; after generating the backup archive of the first virtual machine, selecting, by the computer system, a second virtual machine from the plurality of virtual machines based on the data describing the input/output load for each of the plurality of virtual machines; and generating, by the computer system, a backup archive of the second virtual machine based on the snapshot for the second virtual machine.

In one embodiment, the first virtual machine has a higher input/output load than the second virtual machine. In one embodiment, the first virtual machine has the highest input/output load of the plurality of virtual machines and the second virtual machine has the second highest input/output load of the plurality of virtual machines. In one embodiment, the method further includes collecting, by the computer system, the data describing an input/output load for each of the plurality of virtual machines.

In part, the disclosure relates to a computer-implemented system for backing up a plurality of virtual machines implemented by a plurality of virtualization hosts, the system comprising at least one processor and operatively associated memory, wherein the at least one processor is programmed to: receive data describing an input/output load for each of the plurality of virtual machines; initiate creation of a snapshot for each of the plurality of virtualization hosts at a snapshot time; select a first virtualization host from the plurality of virtualization hosts based on the data describing the input/output load for each of the plurality of virtual machines; generate a backup archive for each of a first set of virtual machines selected from the plurality of virtual machines that are hosted by the first virtualization host; after beginning to generate the backup archive for each of the first set of virtual machines, select a second virtualization host from the plurality of virtualization hosts based on the data describing the input/output load for each of the plurality of virtual machines; and generate a backup archive for each of a second set of virtual machines selected from the plurality of virtual machines that are hosted by the second virtualization host.

In one embodiment, the backup times for the first set of virtual machines and the second set of virtual machines are equal to the snapshot time. In one embodiment, the first set of virtual machines hosted by the first virtualization host have a collective input/output load greater than the collective input/output load of the second set of virtual machines hosted by the second virtualization host.

In one embodiment, the at least one processor is further programmed to: determine that the plurality of virtualization hosts comprises additional virtualization hosts; select a third virtualization host machine from the additional virtualization hosts machines based on the data describing the input/output load for each of the plurality of virtual machines; and generate a backup archive for each of a third set of virtual machines selected from the plurality of virtual machines that are hosted by the third virtualization host.

In part, the disclosure relates to a computer-implemented method for backing up a plurality of computing devices. The method includes receiving, by a computer system, data describing an input/output load for each of the plurality of computing devices, wherein the computer system comprises at least one processor and operatively associated memory; initiating, by the computer system, creation of a snapshot for each of the plurality of computing devices at a snapshot time; selecting, by the computer system, a first computing devices from the plurality of computing devices based on the data describing the input/output load for each of the computing devices; generating, by the computer system, a backup archive of the first computing device based on the snapshot for the first computing device; after generating the backup archive of the first computing device, selecting, by the computer system, a second computing device from the plurality of computing devices based on the data describing the input/output load for each of the plurality of computing devices; and generating, by the computer system, a backup archive of the second computing device based on the snapshot for the second computing device.

In one embodiment, the first computing device and the second computing device are selected from a group consisting of a server, a virtualization host server, a data repository, a disk, a mobile device, a game console, a laptop computer, and a desktop computer. In one embodiment, the computer system is one of the plurality of computing devices. In one embodiment, the computer system is one of the first computing device or the second computing device. In one embodiment, the snapshot is a hardware snapshot.

BRIEF DESCRIPTION OF THE DRAWINGS

FIG. 7 is a flow chart showing one embodiment of a process flow for creating backup archives of virtual machines.

DESCRIPTION

Figure 1:
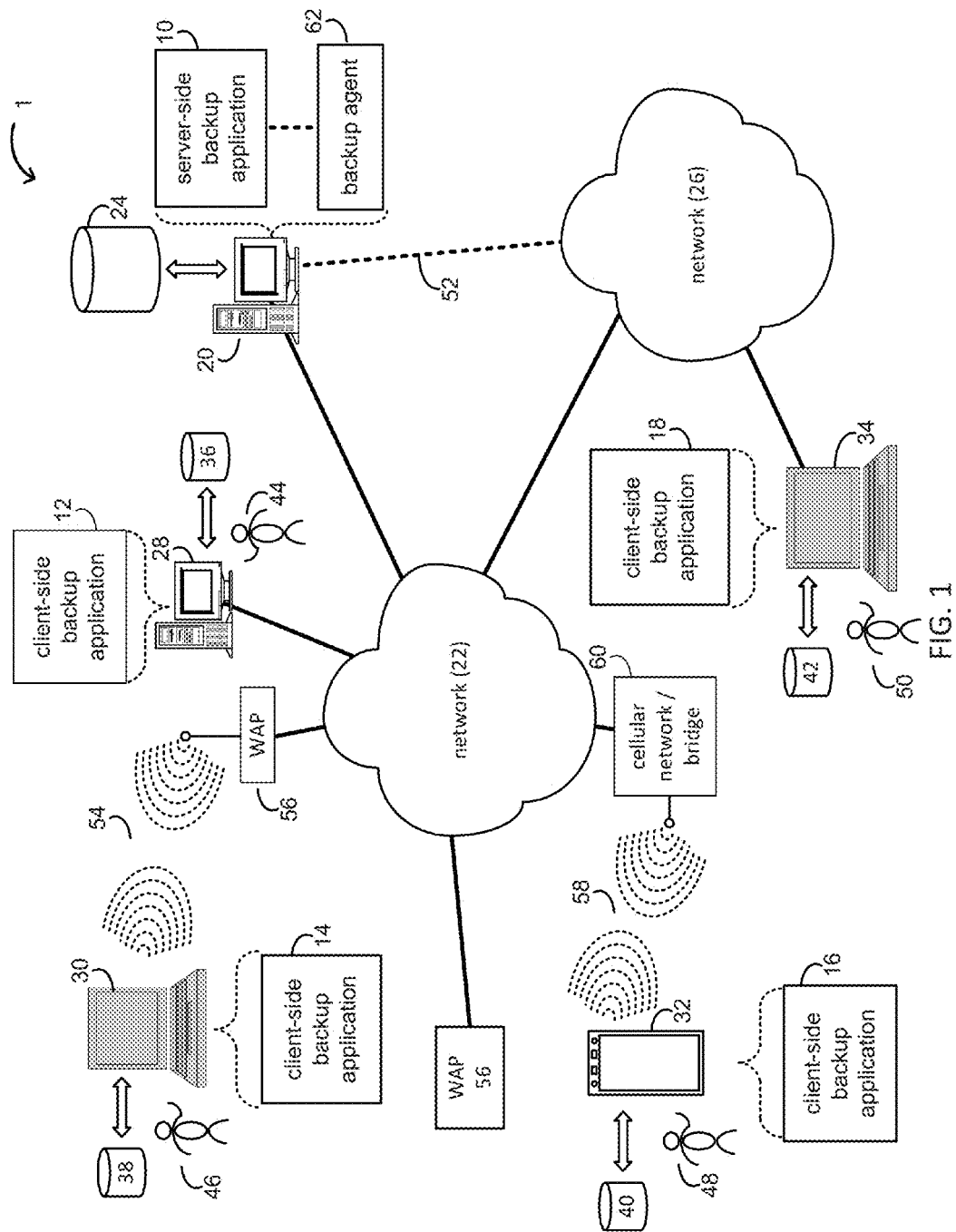
FIG. 1 is a diagram showing one embodiment of an environment for generating backup archives.

Various embodiments are directed to systems and methods for creating backup archives for virtual machines (virtual machines) utilizing snapshots. A cloud provider may implement one or more backup engines for creating and administering the backup archives on behalf of a tenant. For example, the tenant may implement a plurality of virtual machines.

Snapshots for a plurality of virtual machines may be taken at or about a first snapshot time. The snapshots may be stored, for example, at a virtualization host or hosts where the virtual machine is resident. The backup engine may use the snapshots to generate a backup archive for each of the virtual machines. Each virtual machine may maintain its snapshot until its backup archive is created (e.g., until the virtual machine is backed-up). The backup engine may create backup archives (back-up) the virtual machines sequentially based on their input/output load. For example, virtual machines with relatively higher input/output loads may be backed-up before virtual machines with relatively lower loads. This many minimize the amount of time that high load virtual machines must maintain snapshots.

The backup archive may be stored at a backup storage that may be onsite at the tenant's physical location or offsite (e.g., at a location associated with the cloud provider). Each backup archive may include the entire content of at least one backed-up virtual machine at a point in time (a backup time). Backup archives may be used to restore virtual machines to their state at the corresponding backup time. The tenant may wish to restore a virtual machine for any reason including, for example, if the virtual machine has crashed, if its virtualization host device has failed, etc. This may ensure persistence of the tenant's applications, data or other resources that are accessed through one or more virtual machines. It is often important for the cloud provider to efficiently create backup archives while virtual machines are in use without unduly affecting operation of the virtual machines. The tenant may expect continued usage of the virtual machine despite backup archive creation. Further, as the tenant's application demands are likely to continue in the event of a virtual machine failure, it is desirable to effect restorations from backup archives as quickly and smoothly.

Snapshots are features supported by many virtualization software platforms. A snapshot of a virtual machine may comprise data stored on the virtualization host device implementing the virtual machine that represents the state of the virtual machine at a point in time, (a snapshot time). For example, a snapshot may indicate a virtual machine's power state (e.g., on, off, suspended), the state of the disks, memory, and/or other storage associated with the virtual machine, the state of other devices associated with the virtual machine such as, for example, network interface cards, etc.

After a snapshot of a virtual machine is taken, the virtual machine (or other suitable component such as a hypervisor) may maintain the virtual machine in a manner that allows its state at the snapshot time to be maintained. For example, taking a snapshot may halt changes to the virtual disk (e.g., the virtual disk that stores the contents of the virtual machine). Subsequent changes to the state of the virtual machine may be stored in a separate snapshot file. In this way, the state of the virtual machine at the snapshot time is maintained. The number and/or frequency of state changes experienced by a given virtual machine may depend on the applications it is running and the transactions it is performing. While the snapshot is maintained, processing by the virtual machine may be slowed. For example, read and write requests may require access to both the virtual disk of the virtual machine and the snapshot file. This may increase both the required time and processing resources. When a virtual machine snapshot is no longer needed, it may be deleted or consolidated. For example, all write and other transactions stored at the snapshot file may be consolidated into the virtual disk of the virtual machine. Subsequent changes may be made directly to the virtual machine instead of to a separate snapshot file. Some virtualization software platforms permit multiple chained snapshots, while others permit only one active snapshot, with each snapshot replacing any prior snapshot. Some data storage hardware devices also support a hardware snapshot. A hardware snapshot may be applied in a manner similar to the virtual machine snapshots described above. For example, when a hardware snapshot of a physical disk is taken, changes to the physical disk may halt. Subsequent reads or writes to the physical disk may be stored in a separate snapshot file.

The backup engine may generate a backup archive of a virtual machine, for example, by reading from the snapshot of the virtual machine (e.g., a virtual disk of the virtual machine) and transferring the data to a backup storage. For example, the backup engine may move individual files or, in some embodiments, may process data within files to select useful information for back-up. The virtual disk can be backed up during a time when its content does not change. Various other processing of the snapshot may also be performed. Copying the virtual disk may be time consuming and it may be necessary to keep the snapshot file alive during the entire backup. As such, performance of the virtual machine may be affected while the snapshot is active. Further, as the snapshot is kept alive for the duration of the backup, the snapshot file may grow and consume significant resources, such as space on a datastore that supports the virtual machine, and additional storage space may become necessary. Also, deleting the snapshot after backup may take significant time and may also consume hardware resources and affect virtual machine performance. For example, many resources of a virtualization host device may be consumed while deleting or consolidating snapshots because additional CPU and RAM usage may be necessary.

FIG. 1 is a diagram showing one embodiment of an environment 1 for generating backup archives. The environment 1 comprises a server-side backup application 10 and client-side backup applications 12, 14, 16, and 18. Server-side backup application 10 and/or one or more of client-side backup applications 12, 14, 16, and/or 18 may execute one or more processes configured to carry out one or more of the features described herein, such as the backup engine 210 described herein below. The backup process may be a server-side process (e.g., server-side backup process 10), a client-side process (e.g., client-side backup process 12, client-side backup process 14, client-side backup process 16, or client-side backup process 18), or a hybrid server-side/client-side process (e.g., a combination of server-side backup process 10 and one or more of client-side backup processes 12, 14, 16, 18).

Referring to FIG. 1, server-side backup process 10 may reside on and may be executed by server computer 20, which may be in communication with network 22 (e.g., the Internet and/or a local area network). Examples of suitable server computers 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side backup process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example. In some embodiments, the web server application may host the configuration portal 304 (FIG. 3) described in more detail herein.

Client-side backup processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side backup processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side backup processes 12, 14, 16, 18 and/or server-side backup process 10 may be processes that run within (i.e., are part of) a cloud computing site, cloud computing application, cloud platform, or cloud environment. Alternatively, client-side backup processes 12, 14, 16, 18 and/or server-side backup process 10 may be stand-alone applications that work in conjunction with the cloud computing site, cloud computing application, cloud platform, or cloud environment. One or more of client-side backup processes 12, 14, 16, 18 and server-side backup process 10 may interface with each other (via network 22 and/or network 26).

Users 44, 46, 48, 50 may access server-side backup process 10 directly through the device on which the client-side backup process (e.g., client-side backup processes 12, 14, 16, 18) is executed, namely client electronic devices 28, 30, 32, 34, for example. Users 44, 46, 48, 50 may access server-side backup process 10 directly through network 22 and/or through secondary network 26. Further, server computer 20 (i.e., the computer that executes server-side backup process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

For the following discussion, server-side backup process 10 will be described for illustrative purposes. It should be noted that server-side backup process 10 may interact with client-side backup process 12 and may be executed within one or more applications that allow for communication with client-side backup process 12. However, this is not intended to be a limitation of this disclosure, as other configurations are possible (e.g., stand-alone, client-side backup processes and/or stand-alone server-side backup processes). For example, some implementations may include one or more of client-side backup processes 12, 14, 16, 18 in place of or in addition to server-side backup process 10.

The systems described herein may include one or more memory elements for backup of software and databases, virtual machines, and computer storage products including instructions to be executed by a processor to cause the processor to implement the methods described herein. The systems described herein may also include a backup archive, where the virtual machine backup file, backup archive file, or backup contents may be located; the backup archive may be disposed in a memory, a portion of a memory, or across one or more memories.

One or more of users 44, 46, 48, and 50 may be cloud administrators at a cloud provider or may be cloud users. The cloud administrators may access and administer a cloud computing site and the cloud-end users may access and interact with the cloud computing site through one or more of client electronic devices 28, 30, 32, 34 (respectively). The cloud computing site may run a cloud or virtualization application such as virtual MachineWare™ or may include bare-metal embedded hypervisors (e.g., virtual Machineware™ ESX™ and virtual Machineware™ ESXi™) that may run directly on server hardware at cloud computing site 20. Further, the cloud computing site may include a vCloud™ architecture that may enhance cooperation between hypervisors.

Figure 2:
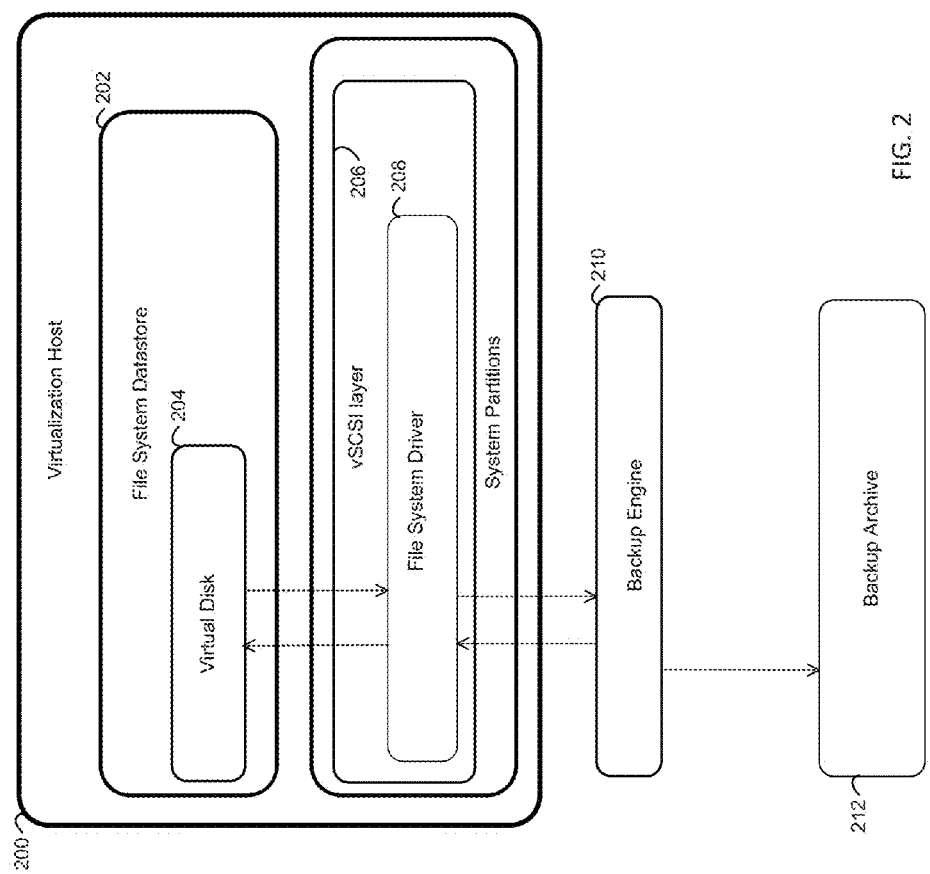
FIG. 2 is a diagram showing one embodiment of a virtualization host and illustrating the creation of a backup archive for a virtual machine.

FIG. 2 is a diagram showing one embodiment of a virtualization host 200 and illustrating the creation of a backup archive 212 for a virtual machine. Virtualization host 200 may be a server computer on which a hypervisor runs one or more virtual machines. A hyperviser may be executed by the virtualization host and/or by other hardware. Virtualization host 200 may be an ESXi host and may run the virtual Machineware™ ESXi™ hypervisor. Virtualization host 200 may use a cluster file system such as Virtual Machine File System (virtual machineFS) or a Network File System (NFS). For example, virtualization host 200 may include file system datastore 202, which may be based on virtual machineFS. Datastore 202 may include one or more virtual disks such as virtual disk 204, which may be a virtual machine disk (virtual machineDK or .vmdk) file. Virtual disk 204 may be a single disk file including the constituent data for an entire virtual machine. File system datastore 202 may be a logical representation of the storage provided by virtualization host 200. Physically, file system datastore 202 may be located on a non-virtual SCSI device in communication with virtualization host 200.

Virtualization host 200 may also include a virtual small computer system interface layer (vSCSI layer 206). The vSCSI layer 206 may be a subsystem of the virtualization host 200 which may enable running a vSCSI filter or file system driver 208 on virtualization host 200. For example, file system driver 208 may be implemented with the vSCSI layer 206 and may be configured to act as a transport layer to send (non-virtual) SCSI data to a virtual machine (virtual machine). The virtual machine can then act or operate on the SCSI data and can capture read and write operations sent through the vSCSI file system driver. The file system driver 208 may be installed into virtualization host device 200 (e.g., into a service console).

Small computer system interface or (SCSI) may be a standard that defines how computers can communicate with other devices, such as printers, scanners, and storage devices. By using SCSI, computers can send and receive information to and from other SCSI devices. Similarly, a vSCSI layer such as vSCSI layer 206 may enable a virtual machine to communicate with SCSI devices. For example, vSCSI layer 206 may allow a virtual machine running on virtualization host 200 to communicate with backup archive 212, which may reside on a SCSI device such as a physical storage disk or drive.

File system driver 208 may be a low-level file system driver or vSCSI filter which may act as a transport layer to send SCSI data to a virtual machine. The virtual machine may then act or operate on the SCSI data. File system driver 208 may be installed on virtualization host 200 (e.g., on vSCSI layer 206) and may allow for high performance reading and writing of SCSI blocks (i.e., data) from virtual disk 204, which may be locked. File system driver 208 may be configured to capture input, output, read, or write requests to and from virtual disk 204. File system driver 208 may be installed into virtualization host 200 on vSCSI layer 206. Further, File system driver 208 may be configured to emulate vSCSI controllers for virtual machines and may work with virtual machineFS partitions and .vmdk files or disks thereon.

Virtualization host 200 may include or be in communication with a backup engine 210 (or multiple backup engines). The backup engine 210 may be implemented by any suitable one or combination of hardware and/or software components from the environment 1 described herein above. For example, the backup engine 210 may be implemented by any one or combination of the server-side backup application 10 and/or the client-side backup applications 12, 14, 16, 18. The backup engine 210 may create a backup archive 212 from the virtual disk 204, for example, as described herein.

Figure 3:
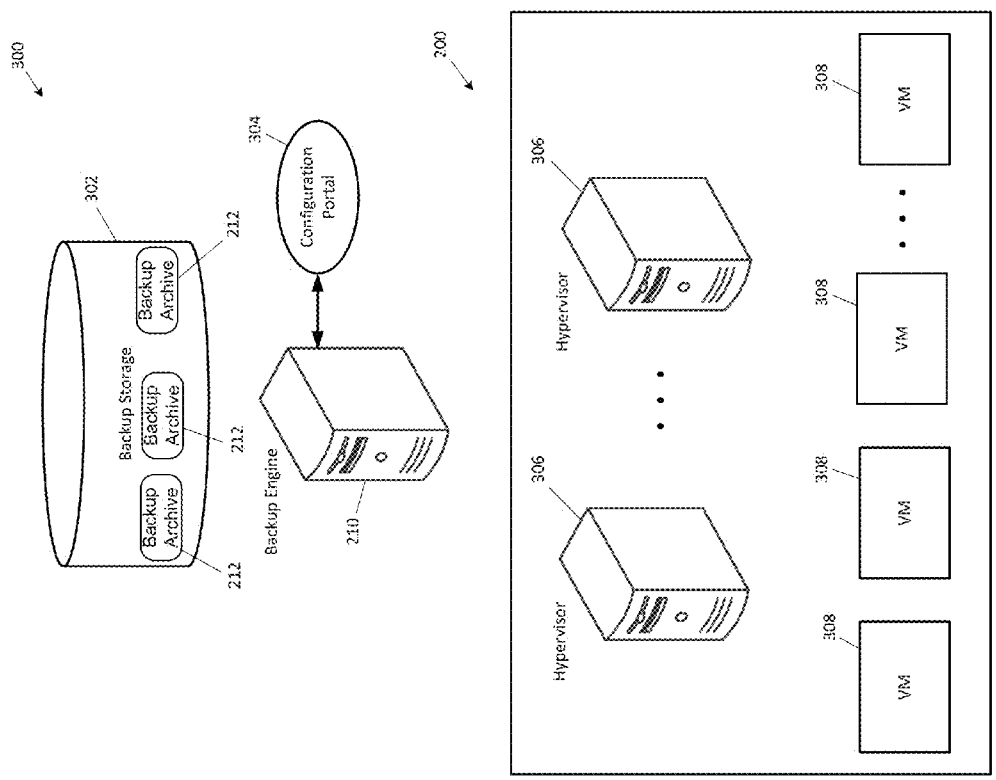
FIG. 3 is a diagram showing one embodiment of an environment for generating backup archives for virtual machines.

FIG. 3 is a diagram showing one embodiment of an environment 300 for generating backup archives 212 for virtual machines 308. The environment 300 includes the backup engine 210 and a backup storage 302 for storing backup archives 212. The backup storage 302 may include any suitable storage hardware at any suitable location or locations. For example, in some embodiments, the backup storage 302 may be implemented at a storage device 24 of the server computer 20 executing the server-side backup application 10. In various embodiments, the backup engine 303 may provide a configuration portal 303. The configuration portal 303 may be accessed by users 44, 46, 48, 50, for example, to configure the backup engine 210 for a backup operation. The backup engine 210 may be in communication with a virtualization host 200. The virtualization host 200 may execute one or more hypervisors 306 managing a plurality of virtual machines 308. For example, each virtual machine 308 may comprise at least one virtual disk 204 stored at the virtualization host 200. Some or all of the virtual machines may be organized into virtual applications, such as vApps (VAPPS) available in systems managed by VMWARE. Virtual machines organized into a common virtual application may be directed towards a common processing task. For example, each virtual machine may form part of an exchange cluster. Also, for example, a virtual application directed to providing an Internet or web application may comprise one or more virtual machines configured as web servers, one or more virtual machines configured to provide business logic, one or more virtual machines configured to manage databases, etc. Although one virtualization host 200 is shown in FIG. 3, the backup engine 210 may be in communication with hypervisors 306 and virtual machines 308 across multiple virtualization hosts 200. Each virtualization host 200 may execute any suitable number of hypervisors and may comprise any suitable number of virtual machines.

Figure 4:
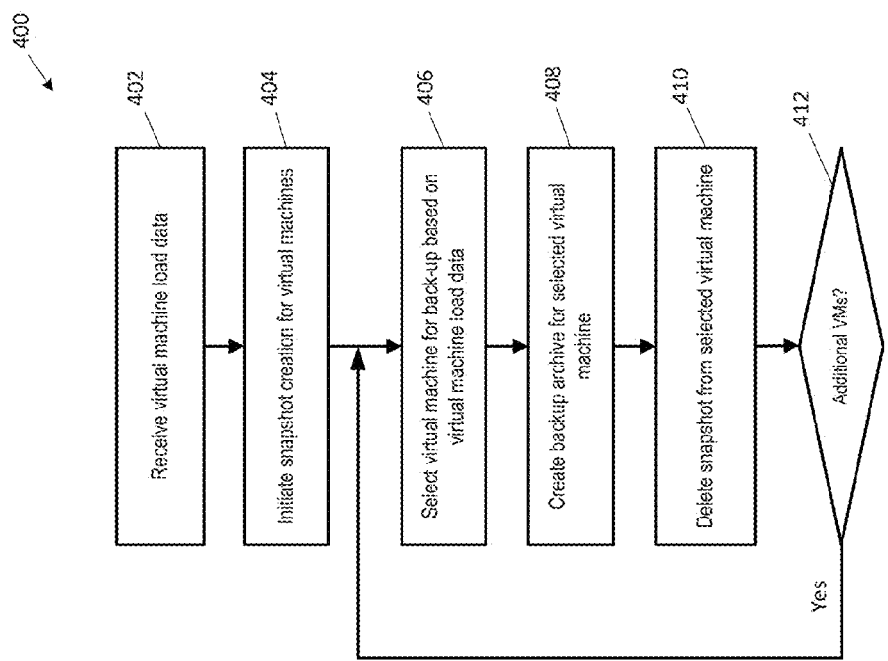
FIG. 4 is a flow chart showing one embodiment of a process flow for creating backup archives of virtual machines.

FIG. 4 is a flow chart showing one embodiment of a process flow 400 for creating backup archives of virtual machines. The process flow 400 may be executed, for example, by the backup engine 210 or any other component of the various environments 1, 300 described herein. At 402, the backup engine may receive virtual machine load data. The load data may indicate the input/output load for a plurality of virtual machines. The backup engine 210 may collect the load data itself. For example, the backup engine 210 may communicate with one or more hypervisors 306 and/or with the virtual machines 308 themselves to monitor the inputs and outputs for the virtual machines 308. In some embodiments, load data may be collected by another component and provided to the backup engine 210. For example, a hypervisor 306, another component of a virtualization host, etc. The input/output load on any particular virtual machine 308 may be expressed in any suitable manner. For example, the input/output load may be expressed as a number of input and/or output operations per unit time, such as a number of input and/or output operations per second (IOPS). Alternatively, the input/output load may be expressed as an amount of data that is the subject of an input and/or output request per unit time, a combination of requests and data per unit time, etc.

At 404, the backup engine 210 may initiate the creation of snapshots at the plurality of virtual machines 308. For example, the backup engine 210 may direct a request to create the snapshots to a hypervisor 306 or other management application. The hypervisor 306 may then direct an instruction to the virtual machines 308 to create the snapshots. In some embodiments, the backup engine 210 may directly instruct the virtual machines 308 to create snapshots. In various embodiments, all of the virtual machines 308 may create snapshots at or about the same time. Accordingly, the snapshot time for all of the virtual machines may be at or about the same time. In some embodiments, the virtual machines 308 (or their hypervisor or hypervisors 306) may be instructed to generate snapshots with a common snapshot time. For example, the virtual machines 308 or hypervisor 306 may be instructed to generate snapshots at a predetermined time in the future (e.g., after the time that the request was sent or received).

At 406, the backup engine 210 may select a virtual machine 308 for backup based on the virtual machine data received at 402. For example, the backup engine 210 may select the virtual machine 308 with the highest input/output load. At 408, the backup engine 210 may create a backup archive 212 for the virtual machine 308 at the backup storage 302. The backup archive 212 may be created based on the snapshot of the first virtual machine 308 taken in response to 404. Accordingly, the backup time of the first virtual machine 308 may be equal to the snapshot time. At 410, the virtual machine 308 may delete and/or consolidate its snapshot. In this way, the virtual machine 308, after creation of the backup archive 212, may continue its normal processing without the handicap of maintaining the snapshot. Deletion of the snapshot may be requested by the backup engine 210 or may be performed automatically by the hypervisor 306 assigned to the virtual machine 308 and/or the virtual machine 308 itself upon completion of the backup archive. In various embodiments, the snapshot of the selected virtual machine 308 may be deleted before the backup archive of the next virtual machine is completed.

At 412, the backup engine 210 may determine whether there are additional virtual machines 308 that have generated snapshots but have not yet been backed up. If yes, the backup engine 210 may again proceed to 406 and selected a next virtual machine 308 for back-up based on the virtual machine load data. For example, the selected virtual machine 308 may be the highest loaded virtual machine that has not yet been backed up. The backup engine 210 may create a backup archive 212 for the selected virtual machine at 408. At 410, the snapshot for the selected virtual machine 308 may be deleted. This process may continue until backup archives are created for all virtual machines 308. In this way, virtual machines 308 having the highest input/output load may be backed up first and, therefore, may be required to maintain snapshots for the shortest amount of time. This may enhance the operations of the tenant's virtual machines. In some embodiments where parallel backup is supported, the backup engine 210 may advance to 412 after beginning backup of the virtual machine selected at 406, but before the backup is completed.

In some embodiments, the backup engine 210 may be capable of generating backup archives of multiple virtual machines 308 in parallel. For example, the backup engine 210 may comprise multiple readers where each reader is capable of reading a virtual machine 308. For example, systems and methods for creating backup copies of files with multiple parallel readers are disclosed in commonly owned U.S. patent application Ser. No. 14/320,546, entitled "Data Backup Parallelization," filed on the same day as the instant application, which is incorporated herein by reference in its entirety.

Figure 5:
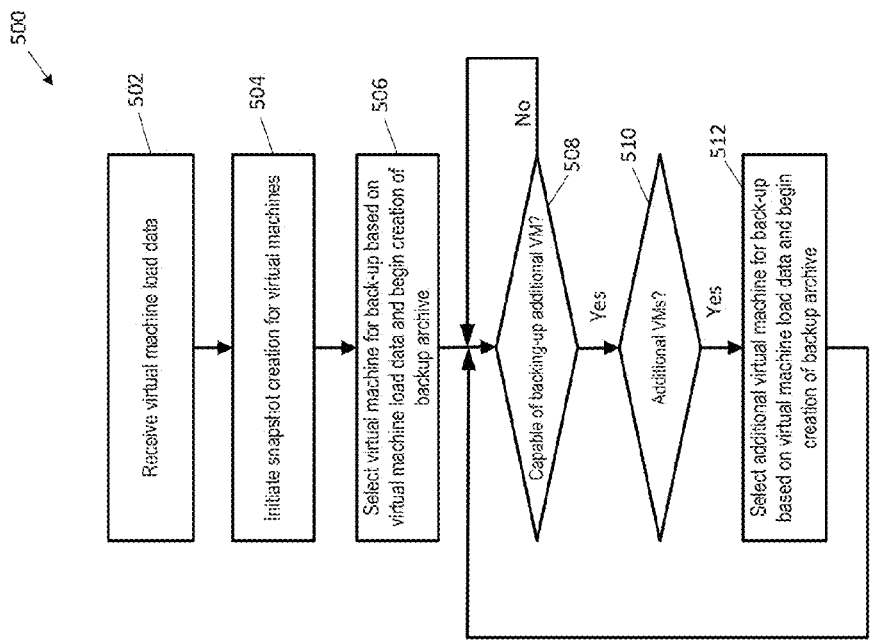
FIG. 5 is a flow chart showing one embodiment of a process flow that may be executed to back up multiple virtual machines in parallel.

FIG. 5 is a flow chart showing one embodiment of a process flow 500 that may be executed to back up multiple virtual machines in parallel. Like the process flow 400, the process flow 500 may be executed by the backup engine 210 and/or any other suitable component of the various architectures 1, 300 described herein. At 502 and 504, the backup engine 210 may receive virtual machine load data and initiate snapshot creation, for example, as described above with respect to 402 and 404. At 506, the backup engine 210 may select a virtual machine 308 for backup based on the virtual machine load data and begin generating a backup archive for the selected virtual machine 308.

At 508, the backup engine 210 may determine whether it is capable of backing up an additional virtual machine 308. For example, a backup engine 210 with multiple readers may determine whether any of its readers are available to backup an additional virtual machine 308. If no, the backup engine 210 may continue to review whether it is capable of backing-up an additional virtual machine at 508 until the answer is yes or the system times out. When the backup engine 210 is available to back-up an additional virtual machine 308, it may determine at 510 whether any additional virtual machines 308 remain to be backed up. If yes, the backup engine 210 may select an additional virtual machine 308 for back up and begin creating of a backup archive for the additional virtual machine 308. As capability for backing-up additional virtual machines 308 becomes available at 508, the backup engine 210 may continue to create backup archives for additional virtual machines 308, for example, until all virtual machines 308 are backed-up.

Figure 6:
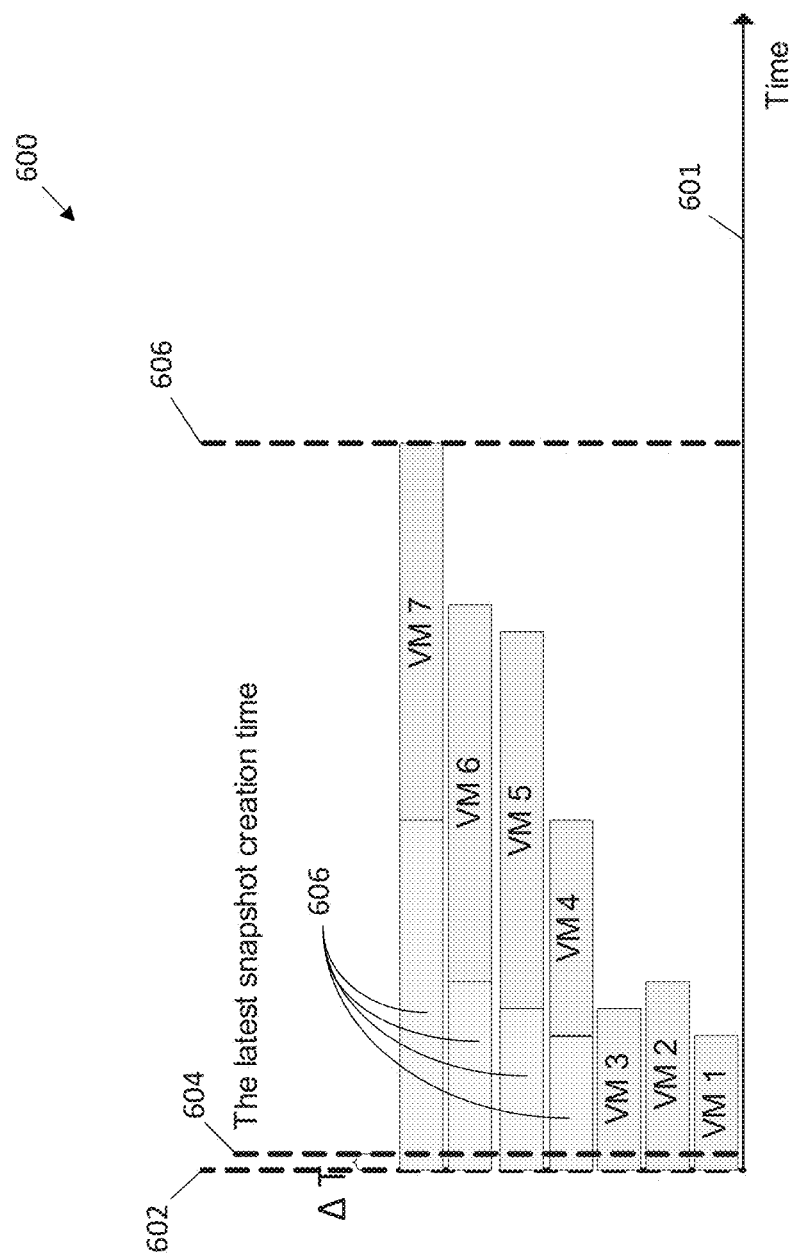
FIG. 6 is timing diagram showing one embodiment for generating backup archives for virtual machines.

FIG. 6 is timing diagram 600 showing one embodiment for generating backup archives for a set of virtual machines labeled VM1 through VM7. In FIG. 6, a horizontal axis 601 represents time. As described, all of the virtual machines VM1 through VM7 may be requested to generate a snapshot at the same time, indicated as 602. In some embodiments, processing and/or communications delays may prevent all of the virtual machines from generating their snapshots at precisely the same time, for example, based on hypervisor load, storage load, etc. A difference in snapshot times for different virtual machines is indicated in FIG. 6 as $\Delta T$. As described above, in some embodiments, snapshots of all of the virtual machines 308 may be configured to have the same snapshot time.

VM1, VM2, and VM3 may be backed up upon completion of their snapshots. For example VM1, VM2, VM3 may be backed-up first, for example, in parallel as described with respect to the process flow 500 above. VM4, VMS, VM6 and VM7 may not be backed-up at first, as indicated by space 606. For example, VM1, VM2, and VM3 may have the highest input/output loads among the virtual machines. As back-up of a virtual machine is completed, back-up for a next virtual machine may begin, for example, based on the input/output load of the next virtual machine. At 606, backup archives may be completed for all of the virtual machines VM1 through VM7. Further, the backup archives for the virtual machines may have a substantially similar backup time.

FIG. 7 is a flow chart showing one embodiment of a process flow 700 for creating backup archives of virtual machines. Like the process flows 400 and 500, the process flow 700 may be executed by the backup engine 210 and/or any other suitable component of the various architectures 1, 300 described herein. At 702, the backup engine 210 may receive backup service configuration data. The backup service configuration data, for example, may define the manner in which the backup engine 210 is to operate. In some embodiments, the backup service configuration data indicates a maximum number of virtual machines that may be backed up in parallel, a maximum number of virtual machines that may be backed up in single batch and/or any other configuration data. The backup service configuration data may be received from any suitable party. In some embodiments, the backup service configuration data may be received from a cloud administrator (e.g., 44, 46, 48, 50) of the cloud provider. The backup service configuration data may be received, for example, via the configuration portal 304 (FIG. 3), by directly accessing one or more of the machines 20, 28, 30, 32, 34 or by any other suitable mechanism.

At 704, the backup engine 210 may receive tenant setup data. Tenant setup data may describe parameters of the backup service including, for example, virtual machines to be backed-up, virtualizations hosts where the virtual machines are resident, hypervisors containing virtual machines, a back-up schedule, etc. Tenant setup data may be received via the configuration portal 304. For example, cloud users 44, 46, 48, 50 of the tenant may provide the tenant setup data to the backup engine 210 from any suitable computer device 20, 28, 30, 32, 34. Further examples of tenant setup data and screens that may be provided via the configuration portal 304 are provided below with respect to FIGS. 8-12. At 706, the background engine 210 may receive virtual machine load data, for example, as described herein above. At 708, the background engine 210 may select a batch of virtual machines 308 for backup based on the load data. The size of the batch may be determined, for example, based on the data received at 702. The batch, in some embodiments, includes the most heavily loaded virtual machines 308. At 710, the backup engine 210 may initiate snapshots at the batch of virtual machines 308, for example, as described herein. At 712, the backup engine 210 may generate backup archives for the set of virtual machines, for example, as described herein with respect to process flows 400 and 500.

Figure 7A:
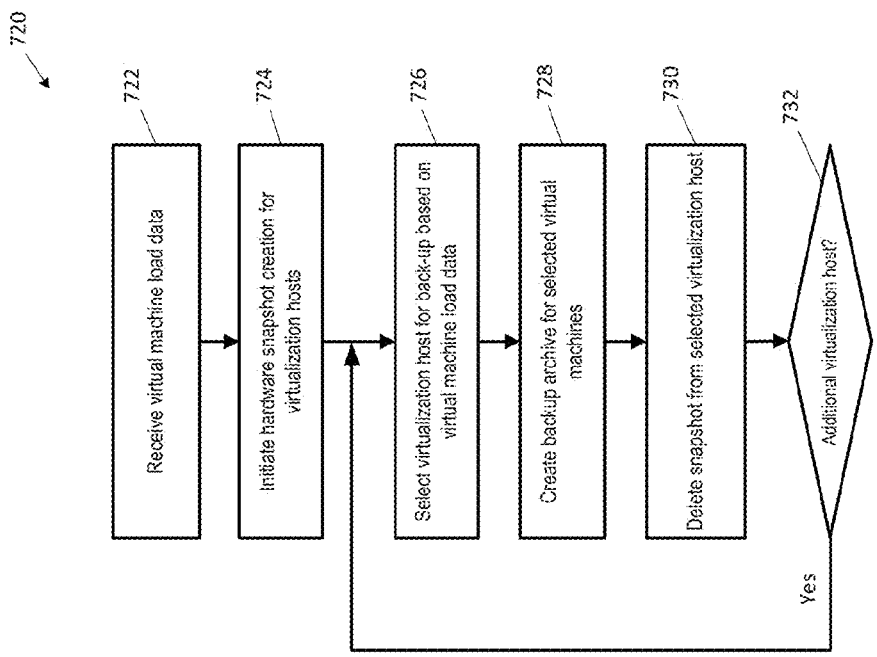
FIG. 7A is a flow chart showing one embodiment of a process flow for generating backup archives based on hardware snapshots.

Although the various process flows 400, 500, 700 are described in the context of virtual machine snapshots, it will be appreciated that any of the systems and methods described herein may also be used to create backup archives based on hardware snapshots. For example, in some cases, virtual machines making up a single virtual application may be physically hosted in different virtualization hosts. FIG. 7A is a flow chart showing one embodiment of a process flow 720, similar to the process flow 400, for generating backup archives based on hardware snapshots. At 722, the backup engine 210 may receive virtual machine load data. The load data may indicate the input/output load on various virtual machines as well as, for example, the virtualization host where each virtual machine is resident. At 724, the backup engine 210 may initiate hardware snapshots at the various virtualization hosts. At 726, the backup engine 210 may select a virtualization host for back-up based on the virtual machine load data. For example, the backup engine 210 may select a virtualization host having the highest collective input/output load on its hosted virtual machines. The collective input/output load on a virtualization host may be measured in any suitable manner including, for example, by summing the input/output load on each virtual machine hosted by the virtualization host, averaging the input/output load across all virtual machines hosted by the virtualization host, etc.

Backup archives for virtual machines on the selected virtual machines may be created at 728. At 730, when all of the virtual machines on the selected virtualization host are backed-up, the snapshot for the selected virtualization host may be deleted. If additional virtualization hosts remain to be backed up, at 732, the backup engine 210 may select an additional virtualization host at 726 and proceed as described. Although the process flow 720 focuses on virtualization hosts, a similar discrimination may be made based on any hardware unit, for example, delineated with a logical unit number (LUN). It will be appreciated that the process flows 500 and 700 described herein may also be implemented with hardware snapshots. For example, referring to FIG. 5, the backup engine 210 may be capable of backing up more than one virtual machine in parallel. Virtual machines backed up in parallel may be on the same virtualization host or on different virtualization hosts.

Figure 8:
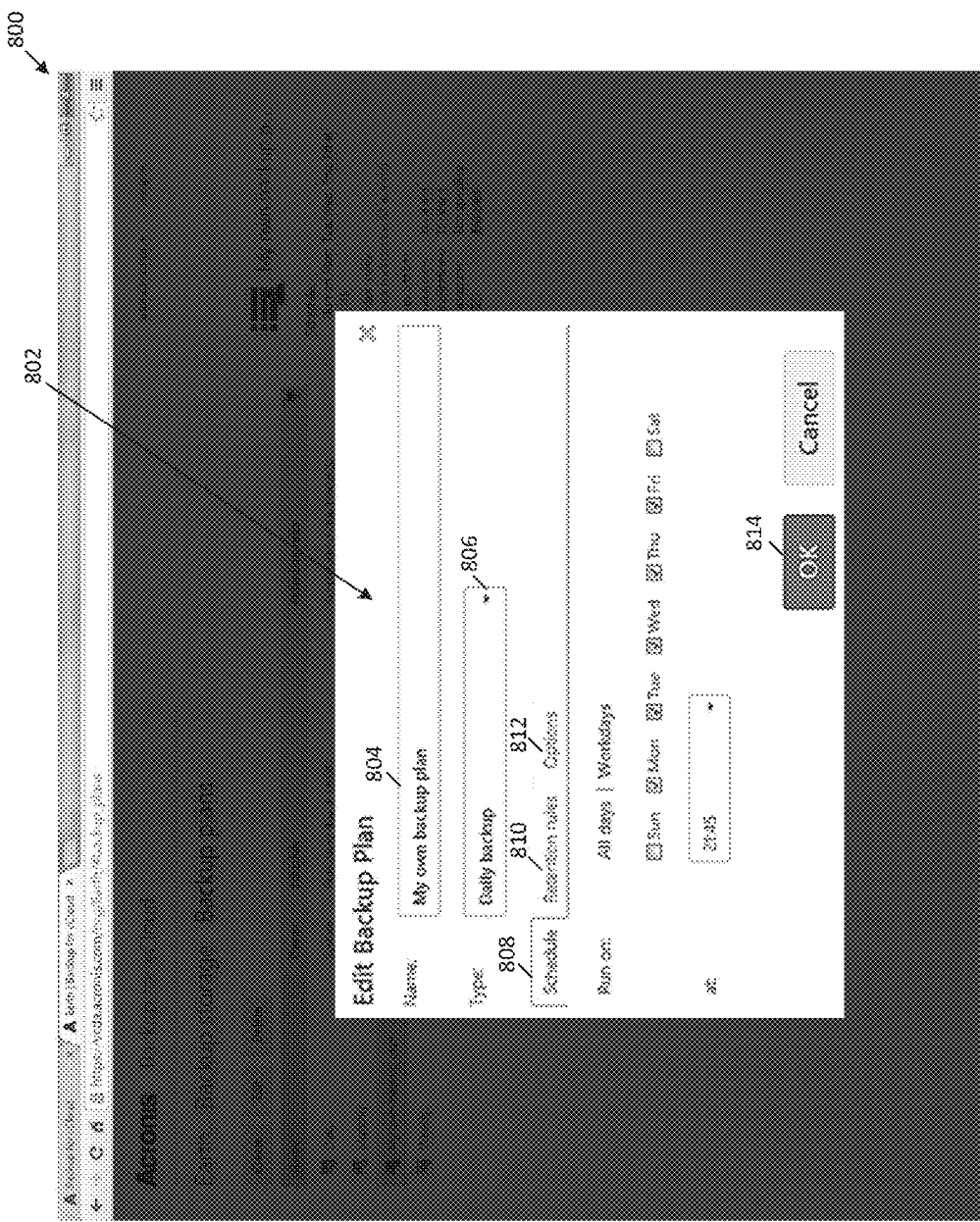
FIG. 8 is a screen shot showing one embodiment of an interface screen that may be provided to a cloud user of the tenant by the configuration portal.

FIG. 8 is a screen shot showing one embodiment of an interface screen 800 that may be provided to a user (e.g., cloud user) of the tenant by the configuration portal 304. For example, the cloud user may provide tenant setup data through the screen 800. The screen 800 may comprise an Edit Backup Plan window 802. The Edit Backup Plan Window 802 may comprise a Name field 804 where the user may indicate a name for a particular backup plan. In the example of FIG. 8, the backup plan is called "My own backup plan." A Type field 806 may allow the user to indicate a type of backup plan. For example, a backup plan may be a daily backup, a weekly backup, a quarterly backup, etc. A schedule tab 808 may allow the user to specify when the backup may occur, for example, including days and times. Days may be specified by day of the week, by workday, etc. Time may be specified on a twelve or twenty-four hour clock. A retention rule tab 810 may allow the user to enter data describing, for example, how long a particular backup archive is to be kept (e.g., six months, fifty-two weeks, etc.). An options tab 812 may allow the user to provide other data describing the backup plan such as, for example, whether and how the backup archives are to be encrypted, who is to be notified of scheduled and unscheduled events during backup including, for example, which events will require notification, etc.

Figure 9:
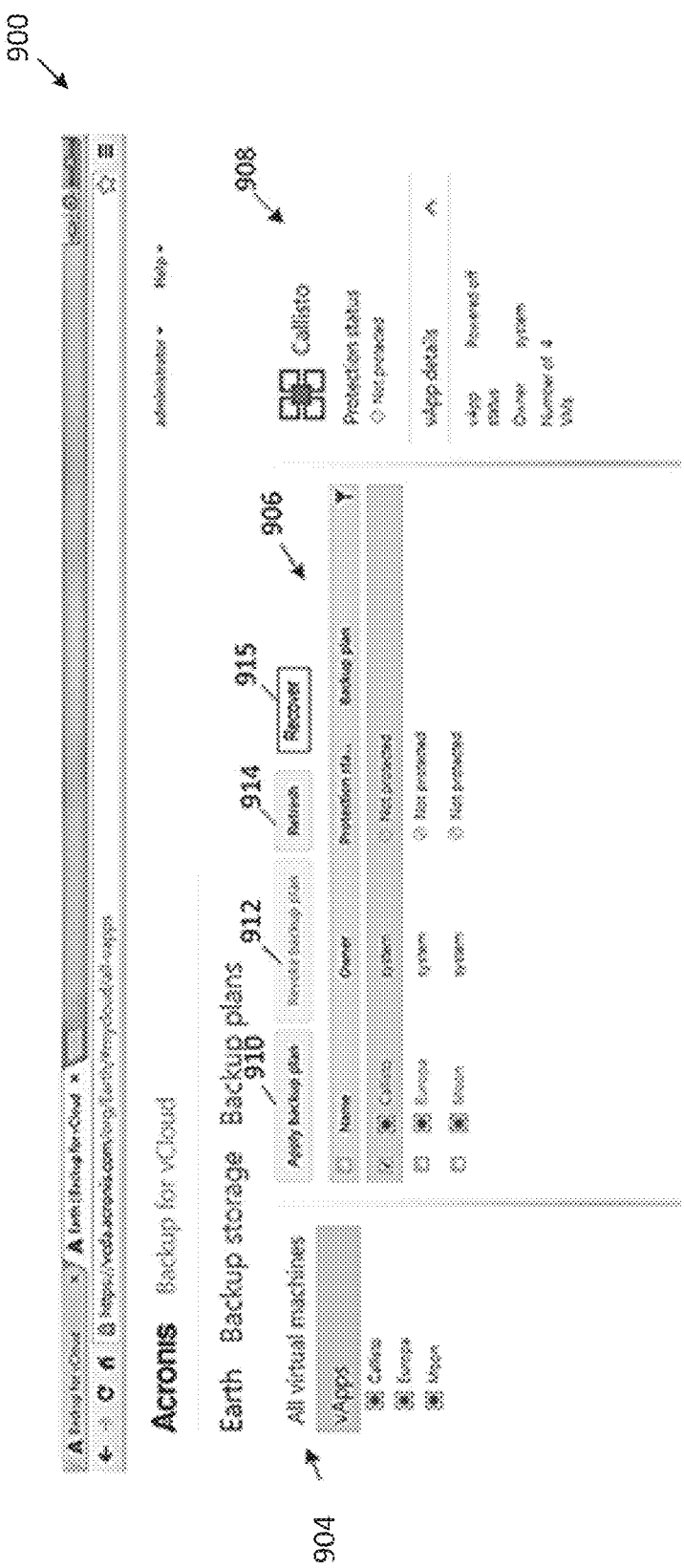
FIG. 9 is a screen shot showing one embodiment of an interface screen that may be provided to a cloud user of the tenant by the configuration portal to receive data describing virtual applications that may contain virtual machines to be backed-up.

When the user has completed window 802, he or she may select the OK button 814. The portal 304 may then display additional screens for receiving additional information about the backup plan. For example, FIG. 9 is a screen shot showing one embodiment of an interface screen 900 that may be provided to a cloud user of the tenant by the configuration portal 304 to receive data describing virtual applications (shown as vApps) that may include virtual machines to be backed-up. Although the interface 900 organizes virtual machines by virtual applications, any other suitable organization may be used. For example, in some embodiments, the interface 900 may organized virtual machines by hypervisor, by virtualization host, etc. The screen 900 comprises a virtual application field 904 including a list of available virtual applications. A virtual application plan field 906 comprises a list of available virtual applications along with an indication of whether a particular virtual application is part of the current backup plan. For example, in FIG. 9, none of the listed virtual applications have been included in a backup plan. The user may refresh the listing of virtual applications in the fields 904, 906 by selecting Refresh button 914. To apply a backup plan to a virtual application, and/or to virtual machines contained by a virtual application, the user may select the virtual application at field 906 and select the Apply backup plan button 910. In some embodiments, the user may recover all virtual machines in a selected virtual application by selecting the virtual application at field 906 and then selecting the Recover button 915.

Figure 10:
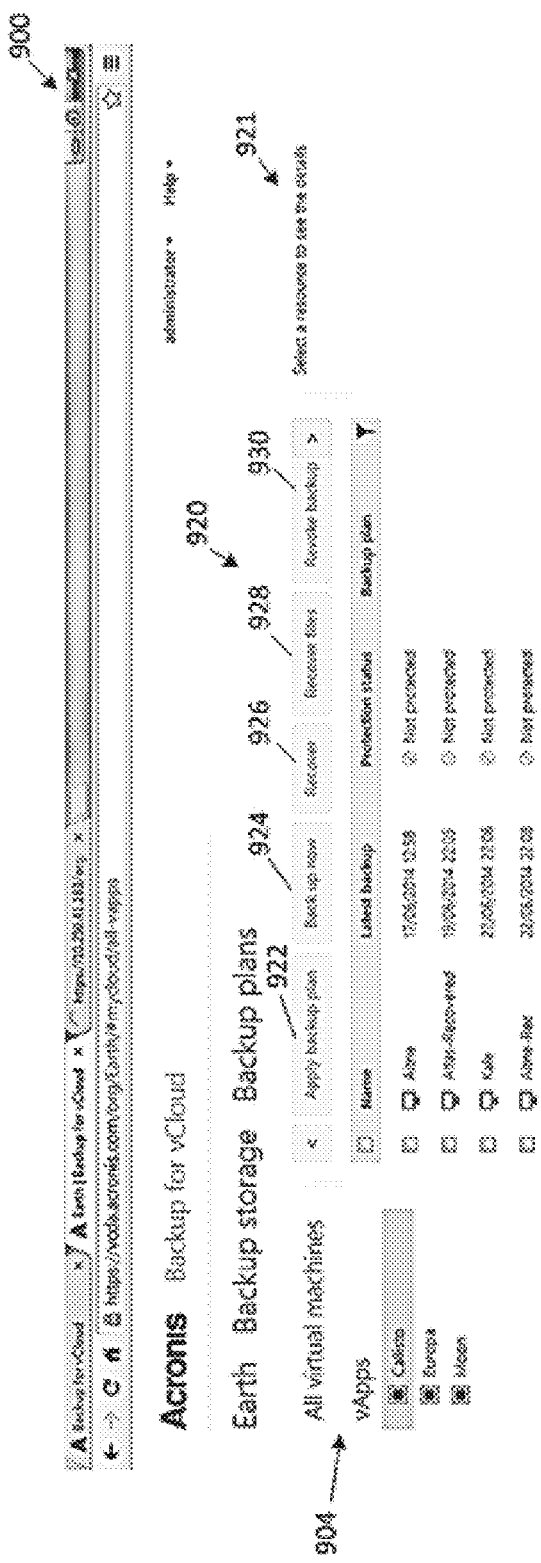
FIG. 10 is a screen shot showing one embodiment of the interface screen of FIG. 9 when a virtual application is selected from the virtual application plan field.

FIG. 10 is a screen shot showing one embodiment of the interface screen 900 when a virtual application is selected from the virtual application plan field 906. In the illustrated example, the virtual application called Callisto is selected. In FIG. 10, the screen 900 comprises a virtual machine field 920 and a virtual machine detail field 921. The field 904 may display the available virtual applications, as in FIG. 9. The selected virtual application (e.g., Callisto) may be highlighted. The virtual machine field 920 lists virtual machines managed by the selected virtual application along with additional data regarding the virtual machines including, for example, the last time that each virtual machine was backed-up and whether the virtual machine is currently protected by a backup plan. The user may select a virtual machine from the field 920 to enter additional configuration information about the virtual machine. For example, selecting Apply backup plan button 922 may apply a backup plan to the selected virtual machine (e.g., the backup plan specified at 802). Selecting the Back up now button 924 may cause a backup engine 210 to immediately back-up the selected virtual machine. Selecting the Recover button 926 may cause the cloud provider to restore the selected virtual machine from the most recent backup archive. Selecting the revoke backup button 930 when the selected virtual machine is part of a backup plan may remove that virtual machine's association with the backup plan.

Figure 11:
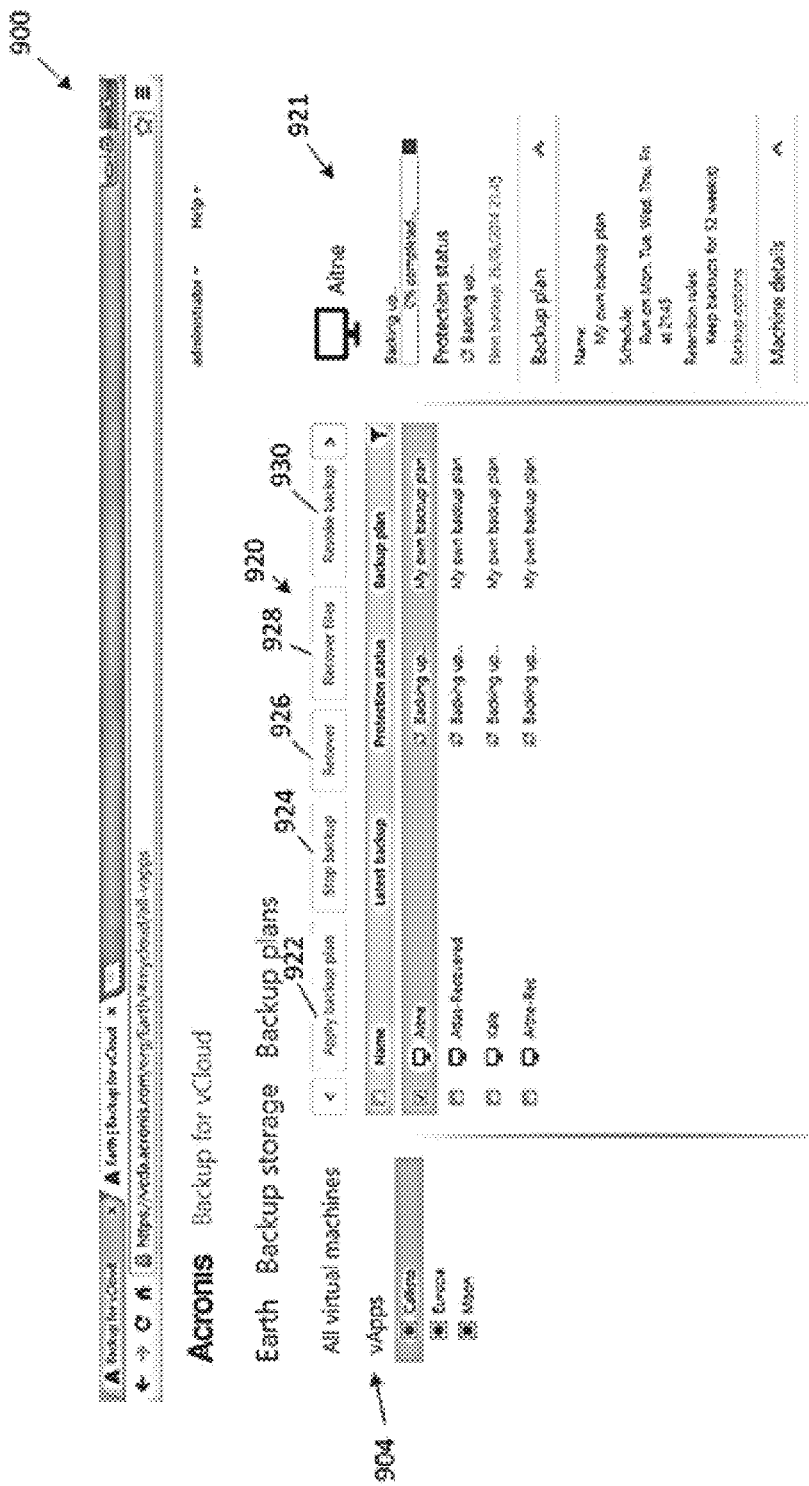
FIG. 11 is a screen shot showing one embodiment of the interface screen of FIG. 9 after the user has selected all of the listed virtual machines to be included in the selected backup plan.
Figure 12:
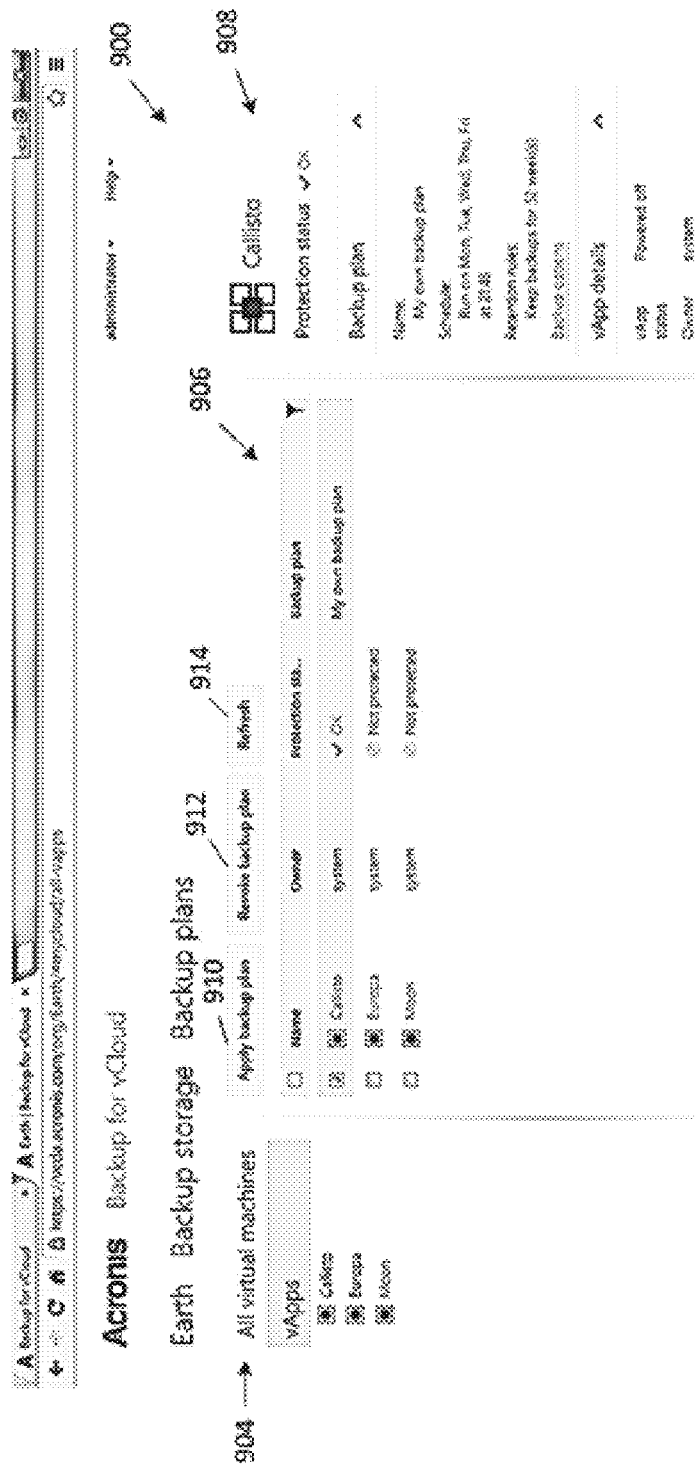
FIG. 12 is a screen shot showing one embodiment of the interface screen after a virtual application has been added to a backup plan, as illustrated in FIGS. 10 and 11.

FIG. 11 is a screen shot showing one embodiment of the interface screen 900 after the user has selected all of the listed virtual machines to be included in the selected backup plan. As shown, the protection status of each of the virtual machines has been updated to indicate that they have been added to the backup plan entitled "my own backup plan" and the protection status for each is indicated as "backing up." Further, the virtual machine called Aitne has been selected at field 920, causing additional information about that virtual machine to be displayed at field 921. The additional information may include, for example, its backup progress, its protection status, the next scheduled backup, details of the backup plan to which it belongs as well as additional details about the virtual machine itself. FIG. 12 is a screen shot showing one embodiment of the interface screen 900 after a virtual application has been added to a backup plan, as illustrated in FIGS. 10 and 11. As illustrated in FIG. 12, the virtual application Callisto is indicated to have the protection status OK and is indicated to be a part of the backup plan specified at screen 800, i.e., My own backup plan.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "agent," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks.

Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A computer-implemented system for backing up a plurality of virtual machines, the system comprising at least one processor and operatively associated memory, wherein the at least one processor is programmed to:
    receive data describing an input/output load for each of the plurality of virtual machines;
    initiate creation of a snapshot for each of the plurality of virtual machines at a snapshot time;
    select a first virtual machine from the plurality of virtual machines based on the data describing the input/output load for each of the plurality of virtual machines;
    generate a backup archive of the first virtual machine based on the snapshot for the first virtual machine;
    after beginning to generate the backup archive of the first virtual machine, select a second virtual machine from the plurality of virtual machines based on the data describing the input/output load for each of the plurality of virtual machines; and
    generate a backup archive of the second virtual machine based on the snapshot for the second virtual machine.

2. The system of claim 1, wherein a backup time of the backup archive for the first virtual machine and a backup time of the backup archive for the second virtual machine is the snapshot time.

3. The system of claim 2, wherein a backup time of the backup archive for the third virtual machine is the snapshot time.

4. The system of claim 1, wherein the at least one processor is further programmed to:
    determine that the plurality of virtual machines comprises additional virtual machines;

select a third virtual machine from the additional virtual machines based on the data describing the input/output load for each of the plurality of virtual machines; and
generate a backup archive of the third virtual machine based on the snapshot for the third virtual machine.

5. The system of claim 1, wherein the first virtual machine has a higher input/output load than the second virtual machine.

6. The system of claim 1, wherein the first virtual machine has the highest input/output load of the plurality of virtual machines and the second virtual machine has the second highest input/output load of the plurality of virtual machines.

7. The system of claim 1, wherein the at least one processor is further programmed to collect the data describing an input/output load for each of the plurality of virtual machines.

8. The system of claim 1, wherein the snapshot for the first virtual machine is deleted before completion of the backup archive for the second virtual machine.

9. The system of claim 1, wherein the at least one processor is further programmed to select the plurality of virtual machines from a set of virtual machines based on input/output load data.

10. The system of claim 9, wherein the plurality of virtual machines comprises a predetermined number of virtual machines.

11. The system of claim 1, wherein the at least one processor is further programmed to:
after beginning generating the backup archive for the first virtual machine and before beginning generating the backup archive of the second virtual machine, select a third virtual machine from the plurality of virtual machines based on the data describing the input/output load for each of the plurality of virtual machines; and
in parallel with the generating the backup archive of the first virtual machine, generate a backup archive of the third virtual machine.

12. The system of claim 1, wherein the at least one processor is further programmed to receive tenant setup data, wherein the tenant setup data indicates the plurality of virtual machines and a schedule for backing up the virtual machines.

13. A computer-implemented method for backing up a plurality of virtual machines, the method comprising:
receiving, by a computer system, data describing an input/output load for each of the plurality of virtual machines, wherein the computer system comprises at least one processor and operatively associated memory;
initiating, by the computer system, creation of a snapshot for each of the plurality of virtual machines at a snapshot time;
selecting, by the computer system, a first virtual machine from the plurality of virtual machines based on the data describing the input/output load for each of the plurality of virtual machines;
generating, by the computer system, a backup archive of the first virtual machine based on the snapshot for the first virtual machine;
after generating the backup archive of the first virtual machine, selecting, by the computer system, a second virtual machine from the plurality of virtual machines based on the data describing the input/output load for each of the plurality of virtual machines; and
generating, by the computer system, a backup archive of the second virtual machine based on the snapshot for the second virtual machine.

14. The method of claim 13, wherein the first virtual machine has a higher input/output load than the second virtual machine.

15. The method of claim 13, wherein the first virtual machine has the highest input/output load of the plurality of virtual machines and the second virtual machine has the second highest input/output load of the plurality of virtual machines.

16. The method of claim 13, further comprising collecting, by the computer system, the data describing an input/output load for each of the plurality of virtual machines.

17. A computer-implemented system for backing up a plurality of virtual machines implemented by a plurality of virtualization hosts, the system comprising at least one processor and operatively associated memory, wherein the at least one processor is programmed to:
receive data describing an input/output load for each of the plurality of virtual machines;
initiate creation of a snapshot for each of the plurality of virtualization hosts at a snapshot time;
select a first virtualization host from the plurality of virtualization hosts based on the data describing the input/output load for each of the plurality of virtual machines;
generate a backup archive for each of a first set of virtual machines selected from the plurality of virtual machines that are hosted by the first virtualization host;
after beginning to generate the backup archive for each of the first set of virtual machines, select a second virtualization host from the plurality of virtualization hosts based on the data describing the input/output load for each of the plurality of virtual machines; and
generate a backup archive for each of a second set of virtual machines selected from the plurality of virtual machines that are hosted by the second virtualization host.

18. The system of claim 17, wherein backup times for the first set of virtual machines and the second set of virtual machines are equal to the snapshot time.

19. The system of claim 17, wherein the first set of virtual machines hosted by the first virtualization host have a collective input/output load greater than the collective input/output load of the second set of virtual machines hosted by the second virtualization host.

20. The system of claim 17, wherein the at least one processor is further programmed to:
determine that the plurality of virtualization hosts comprises additional virtualization hosts;
select a third virtualization host machine from the additional virtualization hosts machines based on the data describing the input/output load for each of the plurality of virtual machines; and
generate a backup archive for each of a third set of virtual machines selected from the plurality of virtual machines that are hosted by the third virtualization host.

21. A computer-implemented method for backing up a plurality of computing devices, the method comprising:
receiving, by a computer system, data describing an input/output load for each of the plurality of computing devices, wherein the computer system comprises at least one processor and operatively associated memory;
initiating, by the computer system, creation of a snapshot for each of the plurality of computing devices at a snapshot time;

selecting, by the computer system, a first computing device from the plurality of computing devices based on the data describing the input/output load for each of the computing devices;

generating, by the computer system, a backup archive of the first computing device based on the snapshot for the first computing device;

after generating the backup archive of the first computing device, selecting, by the computer system, a second computing device from the plurality of computing devices based on the data describing the input/output load for each of the plurality of computing devices; and generating, by the computer system, a backup archive of the second computing device based on the snapshot for the second computing device.

22. The method of claim 21 wherein the first computing device and the second computing device are selected from a group consisting of a server, a virtualization host server, a data repository, a disk, a mobile device, a game console, a laptop computer, and a desktop computer.

23. The method of claim 21 wherein the computer system is one of the plurality of computing devices.

24. The method of claim 21 wherein the computer system is one of the first computing device or the second computing device.

25. The method of claim 21 wherein the snapshot is a hardware snapshot.

* * * * *